(No Model.)
J. SPRUCE.
FLUSH PULL.
No. 299,032. Patented May 20, 1884.
Fig. 1
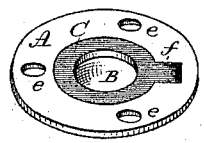
Fig. 2     Fig. 3     Fig. 4.
     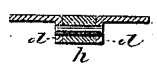     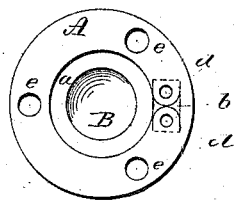
Fig. 5     Fig. 6     Fig. 7
          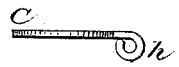

UNITED STATES PATENT OFFICE.

JAMES SPRUCE, OF WATERBURY, CONNECTICUT, ASSIGNOR TO THE SCOVILL MANUFACTURING COMPANY, OF SAME PLACE.

FLUSH-PULL.

SPECIFICATION forming part of Letters Patent No. 299,032, dated May 20, 1884.

Application filed November 10, 1883. (No model.)

*To all whom it may concern:*

Be it known that I, JAMES SPRUCE, of Waterbury, in the county of New Haven and State of Connecticut, have invented a new Improvement in Flush-Pulls; and I do hereby declare the following, when taken in connection with accompanying drawings and the letters of reference marked thereon, to be a full, clear, and exact description of the same, and which said drawings constitute part of this specification, and represent, in—

Figure 1, a perspective view; Fig. 2, a side view; Fig. 3, a section cutting through the hinge; Fig. 4, a top view of the plate, showing the manner of forming the ears; Fig. 5, a section cutting through the opening $b$ in the plate, showing one ear turned down; Fig. 6, the handle as cut from sheet metal; Fig. 7, a side view of the handle, showing the method of forming the knuckle.

This invention relates to an improvement in that class of pulls which consist of a plate having a sunken recess, in which a loop-like handle is arranged, and so as to turn down into the recess when not required for use, and lie substantially flush with the upper surface of the plate, but so as to be turned from the plate to be used as a pull, and such as commonly called "flush-pulls."

In the usual construction of this class of pulls the plate has been made from cast metal, with a hole through the plate at the periphery of the recess, with ears upon the under side of the plate to receive the shank of the handle. The handle itself has also usually been made from cast metal. The expense of finishing the plate and the handle is so great as to make this an expensive article.

The object of my invention is to construct the pull so as to avoid the expensive finishing and fitting heretofore generally necessary; and it consists in the plate struck from sheet metal to form the recess and shoulder upon which the handle will lie, with ears cut in the plate at the periphery of the recess and turned downward beneath the plate, and also in the handle cut from sheet metal with an extension radially from one edge bent up to form a knuckle to pass through the recess in the plate between the ears, and through which and the ears the pintle is passed, as more fully hereinafter described.

I cut the plate A from sheet metal, preferably in circular form. In the center a recess, B, is formed by a depression in the metal for the finger, and around this recess is the shoulder $a$, upon which the handle is to lie, the depth of this shoulder corresponding to the thickness of the handle. At one side, and at the periphery of the recess, an opening, $b$, is cut, the sides of the opening in length corresponding to the width of the knuckle on the handle. At each end of the opening the metal is left uncut from the body, the two ends turned down to form ears $d\ d$, the ears pierced to receive the pintle; the plate is pierced, as at $e$, for the securing-screws.

The handle C is cut from sheet metal, as seen in Fig. 6. This is of ring shape, corresponding to the shoulder $a$ of the recess, and so as to fit closely therein. Radially from one side is a projecting tongue, $f$. This tongue in width corresponds to the opening $b$ in the plate, and is of length to be bent up and form the knuckle $h$, (see Fig. 7,) and so that when placed into the opening $b$ in the plate the handle portion will lie flush in the recess and the pintle pass through the ears and knuckle, as seen in Fig. 3.

By striking the plate and ring from sheet metal, each is substantially finished in the operation of striking, and the mechanical labor required thereafter is very little compared with the mechanical labor required in the cast-metal article.

I am aware that it is a common and well-known expedient in the manufacture of articles of hardware to construct the face-plate or exposed portion in circular form, so as to be introduced into the wood in a corresponding circular hole, which may be made by a boring-instrument, and therefore, while I illustrate the face-plate in my pull as of such circular shape, I do not claim such shaped face-plate as my invention.

I claim—

The herein-described flush-pull, consisting of the plate A, cut from sheet metal, having the recess B and shoulder $a$ struck therein, with the opening $b$ and ears $d$ $d$ formed in said
5 opening and turned downward, combined with a handle corresponding to the shoulder of the recess, and constructed with a knuckle to pass into the opening $b$ and between the ears $d$ $d$, and a pintle through said ears and knuckle, substantially as described.

JAMES SPRUCE.

Witnesses:
T. R. HYDE, Jr.,
M. L. SPERRY.